USO11180184B2

(12) United States Patent
Brooks et al.

(10) Patent No.: US 11,180,184 B2
(45) Date of Patent: Nov. 23, 2021

(54) AUTOMATIC STEERING CALIBRATION OF AN AGRICULTURAL MACHINE

(71) Applicant: CNH Industrial America LLC, New Holland, PA (US)

(72) Inventors: Nathan Brooks, Manitowoc, WI (US); Steven Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 384 days.

(21) Appl. No.: 16/257,480

(22) Filed: Jan. 25, 2019

(65) Prior Publication Data

US 2020/0239063 A1 Jul. 30, 2020

(51) Int. Cl.
  *B62D 5/00* (2006.01)
  *A01C 23/00* (2006.01)
  *B62D 6/00* (2006.01)

(52) U.S. Cl.
  CPC .............. *B62D 5/006* (2013.01); *A01C 23/00* (2013.01); *B62D 6/008* (2013.01); *B60Y 2200/22* (2013.01)

(58) Field of Classification Search
  CPC ........ B62D 5/006; B62D 6/008; A01C 23/00; B60Y 2200/22
  See application file for complete search history.

(56) References Cited

U.S. PATENT DOCUMENTS

| 4,674,061 | A | | 6/1987 | Diskowski et al. |
|---|---|---|---|---|
| 5,012,415 | A | | 4/1991 | Boe et al. |
| 5,082,097 | A | | 1/1992 | Goeckner et al. |
| 5,194,851 | A | * | 3/1993 | Kraning ............... B62D 7/1509 180/415 |
| 5,427,195 | A | * | 6/1995 | Paul ....................... B60K 17/30 180/242 |
| 5,502,999 | A | | 4/1996 | Seberger et al. |
| 5,784,945 | A | | 7/1998 | Krone et al. |
| 5,899,292 | A | * | 5/1999 | Paul ..................... F15B 13/022 180/419 |
| 6,341,552 | B1 | | 1/2002 | Potter et al. |

(Continued)

OTHER PUBLICATIONS

"SteerCommand Operators Manual PN 2006241—ENG REV. D"; Manual; 74 pages; Ag Leader Technology; available at: https://support.agleader.com/kbp/Index.php?View=afile&EntryID=1581&AttachID=3603.

*Primary Examiner* — Jacob D Knutson
*Assistant Examiner* — Michael R Stabley
(74) *Attorney, Agent, or Firm* — Rebecca L. Henkel; Rickard K. DeMille

(57) ABSTRACT

By using various feedback data on a sprayer system, such as sensed positions of power actuators for turning wheels, an onboard logic controller can be used to fine tune parameters of the steering system in an automatic calibration process. In one aspect, a controller can send an electrical signal to a coil of a hydraulic pump to fully extend a power actuator for turning a wheel in a first direction, then incrementally adjust the signal until a change in position of the power actuator is determined, thereby obtaining a precise magnitude for commanding a full extension of the power actuator. Similarly, the controller can change the signal to fully retract the power actuator for turning the wheel in a second direction, then incrementally adjust the signal until a change in position of the power actuator is determined, thereby obtaining a precise magnitude for commanding a full retraction of the power actuator.

17 Claims, 7 Drawing Sheets

(56) References Cited

U.S. PATENT DOCUMENTS

| | | | |
|---|---|---|---|
| 6,347,517 B1 | 2/2002 | Sereni | |
| 6,965,822 B2 | 11/2005 | Brome et al. | |
| 7,363,186 B1 | 4/2008 | Costello et al. | |
| 8,602,153 B2 * | 12/2013 | Osswald | B60K 25/06 180/306 |
| 8,694,382 B2 | 4/2014 | Aznavorian | |
| 8,718,880 B2 | 5/2014 | Cadman | |
| 9,279,736 B2 | 3/2016 | Hughes | |
| 9,308,939 B2 * | 4/2016 | Osswald | E02F 9/2004 |
| 9,507,348 B2 | 11/2016 | Payne et al. | |
| 10,004,171 B2 * | 6/2018 | Ballu | A01B 63/006 |
| 10,077,071 B2 | 9/2018 | Oldridge | |
| 10,421,484 B2 * | 9/2019 | Fay, II | B62D 9/00 |
| 10,689,029 B2 * | 6/2020 | Schwalbe | B62D 7/06 |
| 2017/0118915 A1 * | 5/2017 | Middelberg | A01D 69/03 |
| 2019/0315395 A1 * | 10/2019 | Schwalbe | B62D 5/12 |

* cited by examiner

AUTOMATIC STEERING CALIBRATION OF AN AGRICULTURAL MACHINE

FIELD OF THE INVENTION

The invention relates generally to agricultural product application equipment, such as self-propelled sprayers and, in particular, to a self-propelled off-road agricultural vehicle configured to receive an input from a user operable to automatically calibrate a steering system so that a magnitude of an electrical signal for controlling a minimum or a maximum extension of a power actuator operable to turn a given wheel is determined.

BACKGROUND OF THE INVENTION

Agricultural machines, such as self-propelled sprayers, are getting larger to increase operating efficiency, such as by covering more area in a single pass of a spraying session. The larger machines are also getting heavier. Hydraulic drive systems have been effectively used to power and steer the wheels of these larger machines, which allows for increased ground clearance because of the absence of mechanical driveline components for the hydraulic drive systems.

Modern agricultural machines may be complex with a variety of systems and devices, such as for steering, throttle control, engine control and the like. Such electronically controlled devices are typically calibrated and configured at the factory. However, over time, excessive wear on particular components may cause such systems and devices to lose some amount of responsiveness.

As a result, service personnel are typically required to interface with the electronically controlled devices, such as via an ISO bus or CAN bus, to perform diagnostics, troubleshoot components and/or re-calibrate aspects of the system. However, this may be time consuming, troublesome and expensive for the operator and service personnel.

Also, in some systems, a user may interact with an onboard computer to re-calibrate aspects of the system. However, this typically requires the user to observe certain characteristics of the machine, such as wheel speed or turn, and select an input marking such characteristic when it occurs. This can be labor intensive and sometimes lead to inaccurate results caused by human error.

SUMMARY OF THE INVENTION

By using various feedback data on a sprayer system, such as sensed positions of power actuators for turning wheels, an onboard logic controller can be used to fine tune parameters of the steering system in an automatic calibration process. In one aspect, a controller can send an electrical signal to a coil of a hydraulic pump to fully extend a power actuator for turning a wheel in a first direction, then incrementally adjust the signal until a change in position of the power actuator is determined, thereby obtaining a precise magnitude for commanding a full extension of the power actuator. Similarly, the controller can change the signal to fully retract the power actuator for turning the wheel in a second direction, then incrementally adjust the signal until a change in position of the power actuator is determined, thereby obtaining a precise magnitude for commanding a full retraction of the power actuator.

Specifically, then, one aspect of the invention can include an agricultural machine, including: a chassis supporting a cab and having multiple wheels; a steering system for steering the wheels and including: multiple power actuators, each power actuator having a rod portion and a base portion, in which the rod portion is extendable with respect to the base portion, and in which extension of the rod portion is operable to turn a given wheel, and a hydraulic system configured to variably extend each of the power actuators; and a processor executing a program stored in a non-transient medium, the processor executing the program to: receive an input from a user operable to automatically calibrate the steering system so that a magnitude of an electrical signal for controlling the hydraulic system to produce a minimum or a maximum extension of a power actuator is determined.

Another aspect of the invention can include: a self-propelled agricultural vehicle, including: a chassis supporting a cab and having two front wheels and two rear wheels for moving the vehicle; an application system supported by the chassis and including at least one storage container storing a volume of product for delivery onto an agricultural field; a steering system for steering the wheels and including: multiple power actuators, each power actuator having a rod portion and a base portion, in which the rod portion is extendable with respect to the base portion, and in which extension of the rod portion is operable to turn a given wheel, and a hydraulic system configured to variably extend each of the power actuators; operator controls provided in the cab, the operator controls including a touchscreen Human Machine Interface (HMI); and a processor executing a program stored in a non-transient medium, the processor executing the program to: receive an input from a user operable to automatically calibrate the steering system so that a magnitude of a first electrical signal for controlling the hydraulic system to produce a minimum or a maximum extension of a power actuator for a front wheel and a second electrical signal for controlling the hydraulic system to produce a minimum or a maximum extension of a power actuator for a rear wheel are determined.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
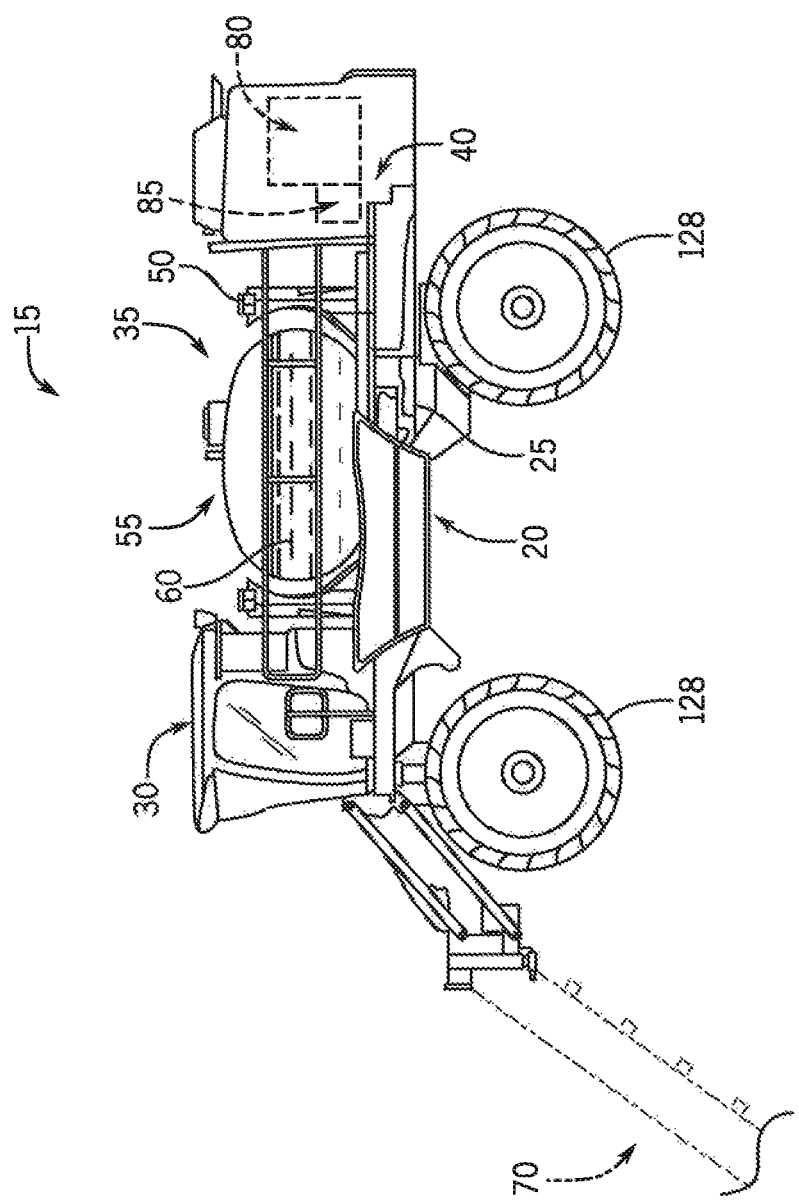
FIG. 1 is a side elevation view of self-propelled off-road agricultural vehicle with a system for automatically implementing calibrations according to the present invention.

Referring now to the drawings and specifically to FIG. 1, a system for receiving an input from a user operable to automatically calibrate a steering system is provided, explained in greater detail elsewhere herein, and is shown for use with an exemplar self-propelled off-road agricultural vehicle. The self-propelled off-road agricultural vehicle may be an agricultural applicator that deposits, for example, liquid, as well as dry and gaseous product, above and below ground, pre-emerge and post-emergence or sprouting of the crop, which includes operations such as seeding, inter-seeding, fertilizing and application of, for example, herbicides, fungicides, and insecticides as well as soil conditioners, growth retardants, and other agents, such as by way of various toolbar attachments, planters, anhydrous ammonia applicators, and others. The self-propelled off-road agricultural vehicle as agricultural applicator may be a sprayer and is shown here by way of example as a self-propelled sprayer 15. The sprayer 15 is shown as a front-mounted boom self-propelled sprayer such as those available from CNH Industrial, including the Miller Nitro and the New Holland Guardian Series front-mounted boom sprayers. Although the sprayer 15 is shown as a front-mounted boom self-propelled sprayer, it is understood that self-propelled versions of the sprayer 15 can have either front-mounted, mid-mount, or rear-mounted booms, as well boom-less sprayers, tiered booms, and detachable sprayers.

Still referring to FIG. 1, sprayer 15 includes chassis 20 having chassis frame 25 that supports various assemblies, systems, and components. These various assemblies, systems, and components include a cab 30, and an application system shown as spray system 35, and a hydrostatic drivetrain system 40. Spray system 35 includes storage containers such as rinse tank 50 storing water or a rinsing solution and product tank that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height-adjustable boom of a boom system 70 for release out of spray nozzles that are spaced from each other along the width of the boom during spraying operations of sprayer 15.

Figure 2:
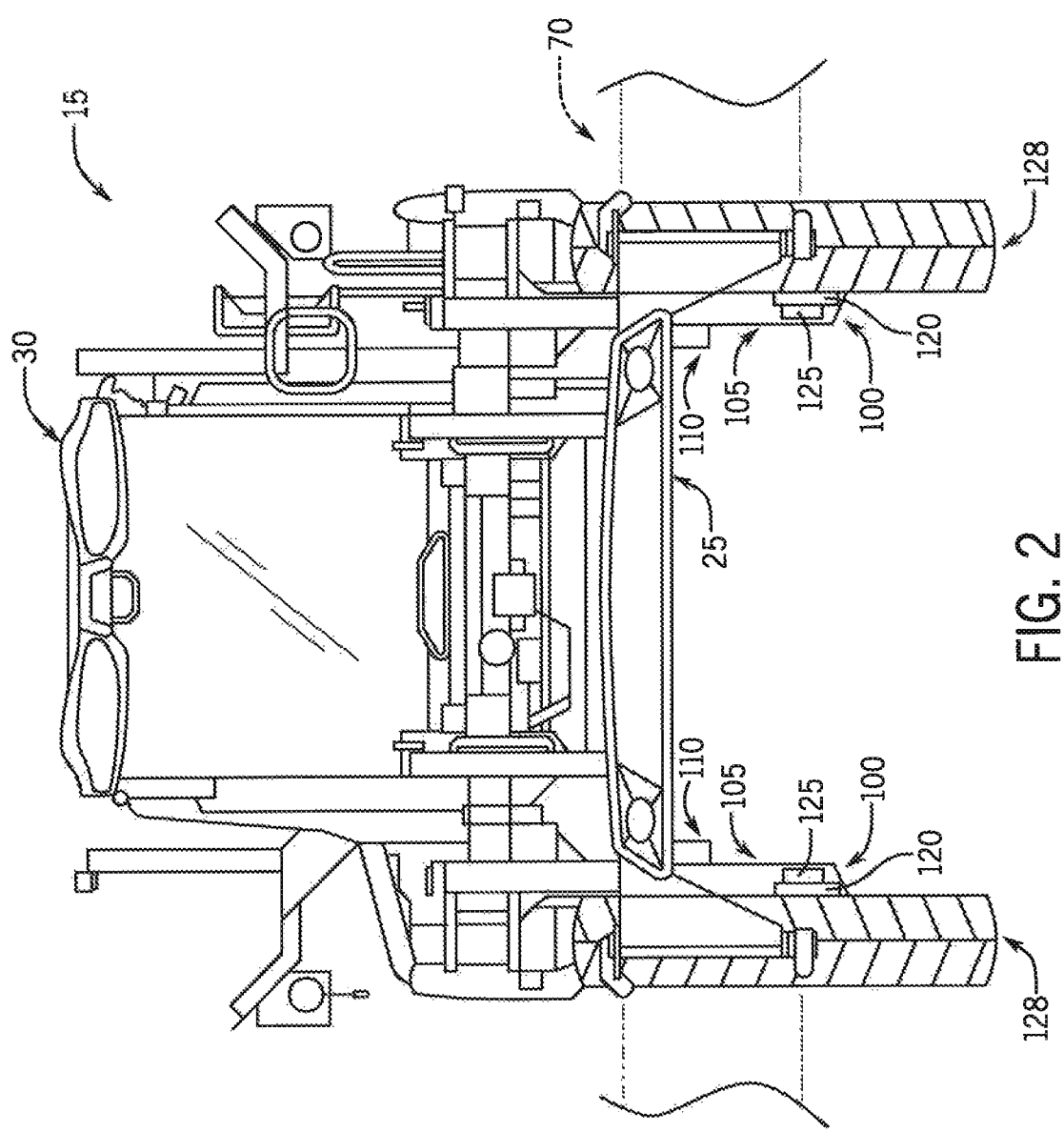
FIG. 2 is a front elevation view of the self-propelled off-road agricultural vehicle of FIG. 1.

Still referring to FIG. 1, the hydrostatic drivetrain system 40 includes an engine 80 and hydrostatic pump system 85 that receives power from the engine 80. The hydrostatic pump system 85 could comprise a tandem pair of variable displacement hydrostatic pumps. Referring now to FIG. 2, wheel drives 100 are supported at bottom ends of legs 105 that extend from swing arms 110 that are pivot mounted to the chassis frame 25. Each wheel drive 100 may include a planetary gear set 120 and a hydraulic motor as a wheel motor 125 which may be a variable displacement wheel motor that directly drives the planetary gear set 120 to establish a direct drive relationship between each wheel drive 100 and its respective wheel 128 of the sprayer 15.

Figure 3:
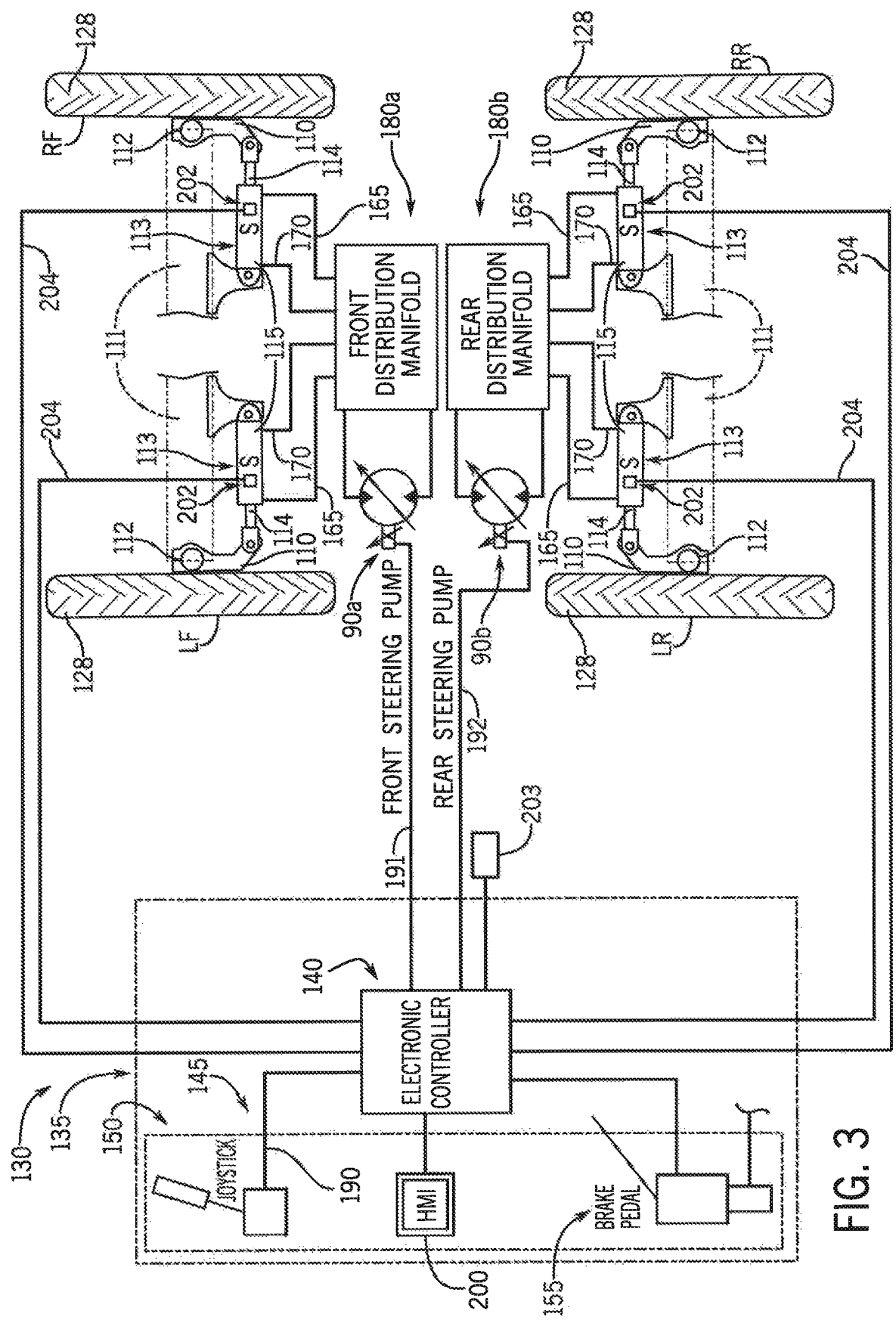
FIG. 3 is a simplified schematic representation of a circuit illustrating various systems according to the present invention.

Referring now to FIG. 3, a steering system 130, including a control system 135 for controlling steering, is illustrated by way of example. The control system 135 includes at least one electronic controller 140 that is configured to control operations of the steering system 130. The electronic controller 140 may include a microprocessor, microcontroller or other logic, such as a Programmable Logic Controller (PLC) or industrial computer, along with corresponding software and suitable memory for storing such software and hardware including interconnecting conductors for power and signal transmission and communication for controlling electronic, electro-mechanical, and hydraulic components of the hydrostatic drivetrain system 40. Communication may be accomplished through direct interconnection such as directly routed wiring harnesses or through one or more serial bus systems such as a CAN (Controller Area Network) bus(es) between the electronic controller 140 and the sensors, actuators, and/or other components of the sprayer 15 for monitoring and controlling corresponding systems and components of the system, such as to control direction, speed and braking of the sprayer 15.

Still referring to FIG. 3, the steering system 130 includes operator controls 145, which provide a user interface(s) allowing an operator to control the steering system 130 and other components of the sprayer 15. The operator controls 145 include a joystick 150 that has a grip with buttons for controlling various corresponding functions of the sprayer 15 including controlling operations of the boom system 70, such as boom height and tilt and spray delivery patterns, as well as controlling movement characteristics of the sprayer 15 such as range and speed controls. Moving the joystick 150 forward and/or backward with respect to a neutral gate may control direction and speed of travel of the sprayer 15. The operator controls 145 also include a brake pedal 155 with an integrated brake valve delivering pressurized hydraulic fluid upon depressing the brake pedal 155 to engage service brakes 160 at each wheel drive 100 to slow rotation of the respective wheel motor 125. Depressing the brake pedal 155 may also send a corresponding signal to the electronic controller 140, which sends a signal to the hydrostatic pump system 85 as a deceleration command to the pumps 90 for slowing the sprayer 15.

The steering system 130 can provide a two-wheel steering mode in which only the front wheels 128, illustrated as left-front ("LF") and right-front ("RF") wheels, are steerable, and a four-wheel steering mode n which the front wheels 128 and the rear wheels 128, further illustrated as left-rear ("LR") and right-rear ("RR") wheels, are each steerable. However, in an alternative aspect, the steering system could be implemented to provide only the two-wheel steering mode. For steerable wheels, each swing arm 110 may be rotated relative to an axle 111 about a kingpin 112 such that the wheels 128 are steered to a desired steering angle. In one aspect, in the two-wheel steering mode, both of the front wheels 128 can be steerable in unison over a range of angles, typically left to right with respect to a forward or rearward travel direction, while both of the rear wheels 128 are maintained at a constant angle, typically 0 degrees or straight ahead. In another aspect, in the four-wheel steering mode, each of the front and rear wheels 128 can be steerable in unison over a range of angles. For example, in the four-wheel steering mode, the front and rear wheels 128 can each be controlled to steer together at the same angle. However, in another aspect of the four-wheel steering mode, the rear wheels 128 can be controlled to steer oppositely with respect to the front wheels 128.

The steerable wheels 128 can be steered with a power actuator 113, such as a hydraulic cylinder, having rod and base portions 114 and 115, respectively, in which the rod portion 114 is extendable and retractable with respect to the base portion 1:15. In one aspect, a first end of the power actuator 113, such as the rod portion 114, can be attached to a swing arm 110, and a second end of the power actuator 113, such as the base portion 115, could be attached to an axle 111, Accordingly, as illustrated, to steer in a first direction, such as to the right, the rod portion 114 of the power actuator 113 can be controlled to extend from the base portion 115 so that the swing arm 110 rotates clockwise about the kingpin 112 to turn the wheel 128 to the right. Conversely, to steer in a second direction, such as to the left, the rod portion 114 of the power actuator 113 can be controlled to retract with respect to the base portion 115 so that the swing arm 110 rotates counter-clockwise about the kingpin 112 to turn the wheel 128 to the left. However, in an alternative aspect, the rod portion 114 could be attached to the axle 111, and the base portion 115 could be attached to the swing arm 110.

To steer the sprayer 15, the user can use the joystick 150 in communication with the electronic controller 140 via an electrical signal 190. The electronic controller 140, in turn, can communicate with hydraulic system comprising a front steering pump 90a, for steering the front wheels, such as in the two-wheel steering mode and/or the four-wheel steering mode, and a rear steering pump 90b, for steering the rear wheels, such as in the four-wheel steering mode, when so configured. In particular, the electronic controller 140 can send a first electrical signal 191 to a coil of the front steering pump 90a, and a second electrical signal 192 to a coil of the rear steering pump 90b. The electrical signals 191, 192 can control the coils in proportion to the turn angle commanded by the user through the joystick 150. The coils can control displacement of hydraulic fluid in the steering system 130. A front distribution manifold 180a may operably interconnect the front steering pump 90a to each of the front wheels 128. Similarly, a rear distribution manifold 180b may operably interconnect the rear steering pump 90b to each of the rear wheels 128. Illustration of corresponding fluid reservoirs, accumulators and the like are omitted for clarity. Each power actuator 113 has an inlet side 165 receiving hydraulic fluid and an outlet side 170 returning hydraulic fluid toward the steering system 130. Since steerable wheels can bi-directionally turn, the inlet and outlet sides 165 and 170, respectively, may be opposite depending on which direction the wheels 128 are turning. Accordingly, the aforementioned coils of the steering pumps 90 may receive electrical currents for electromagnetically actuating the pumps for producing varying pressure flows within the system for steering in the two-wheel and/or four-wheel steering modes. A minimum amount of current (minimum value) required for turning a given wheel 128 fully in a first direction (such as fully to the left) may be calibrated for each steerable wheel. Similarly, a maximum amount of current (maximum value) required for turning the given wheel 128 fully in a second direction (such as fully to the right) may be calibrated for each steerable wheel. Also, a centering amount of current (between the minimum and maximum values) required for centering the wheel 128 (such as 0 degrees or straight ahead) may be calibrated for each steerable wheel.

Still referring to FIG. 3, a touchscreen Human Machine Interface (HMI) 200, in the cab 30, is provided for receiving inputs from a user of the sprayer 15. In particular, the HMI 200 can receive an input operable to automatically calibrate the steering system 130 so that a magnitude of one or more of the aforementioned electrical signals for controlling the steering system 130 can be precisely determined. Accordingly, the HMI 200 can implement automatic on-screen calibration of the steering system of the sprayer 15, including with respect to the front and rear steering pumps 90a and 90b, respectively, for steering the front and/or rear wheels 128. The HMI 200 includes a touchscreen allowing high resolution color graphic display with the capability of receiving touch commands on the screen from an operator or user. The HMI 200 may connect to a machine controller, such as the electronic controller 140, for example, such as via an Society of Automotive Engineers (SAE) J1939 bus, International Organization for Standardization (ISO) 11783 (ISOBUS), ISO 11898 bus and/or other Controller Area Network (CAN) bus. Accordingly, the HMI 200, via the electronic controller 140, may communicate and interact with various systems and electronically controlled devices of the sprayer 15 to effect calibrations, including the steering system 130.

Figure 4:
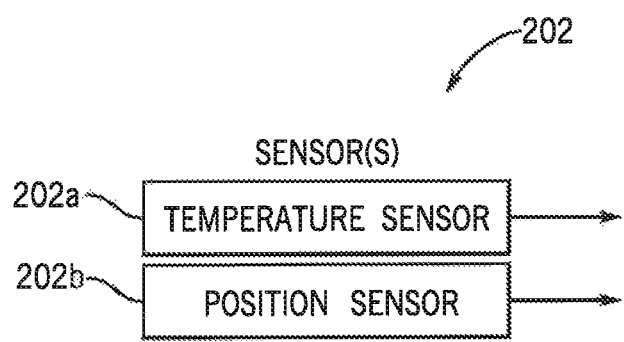
FIG. 4 is a detailed view of a sensor array in the schematic of FIG. 3.

To achieve automatic calibration with minimal user input, a sensor array 202 can be arranged with respect to each wheel 128. The sensor array 202 can continuously send variously sensed measurements to the electronic controller 140 via electrical signals 204. With additional reference to FIG. 4, in one aspect, the sensor array 202 could include a temperature sensor 202a and/or a position sensor 202b, among other sensors. The temperature sensor 202a could comprise, for example, a thermocouple arranged proximal to the wheel 128 for determining a temperature of the wheel and/or hydraulic fluid running through the hydraulic system and the power actuator 113. The position sensor 202b could comprise, for example, a linear position sensor arranged with respect to the power actuator 113 for individually determining stroke measured with respect to the rod and base portions 114 and 115, respectively, extending and retracting.

Figure 5:
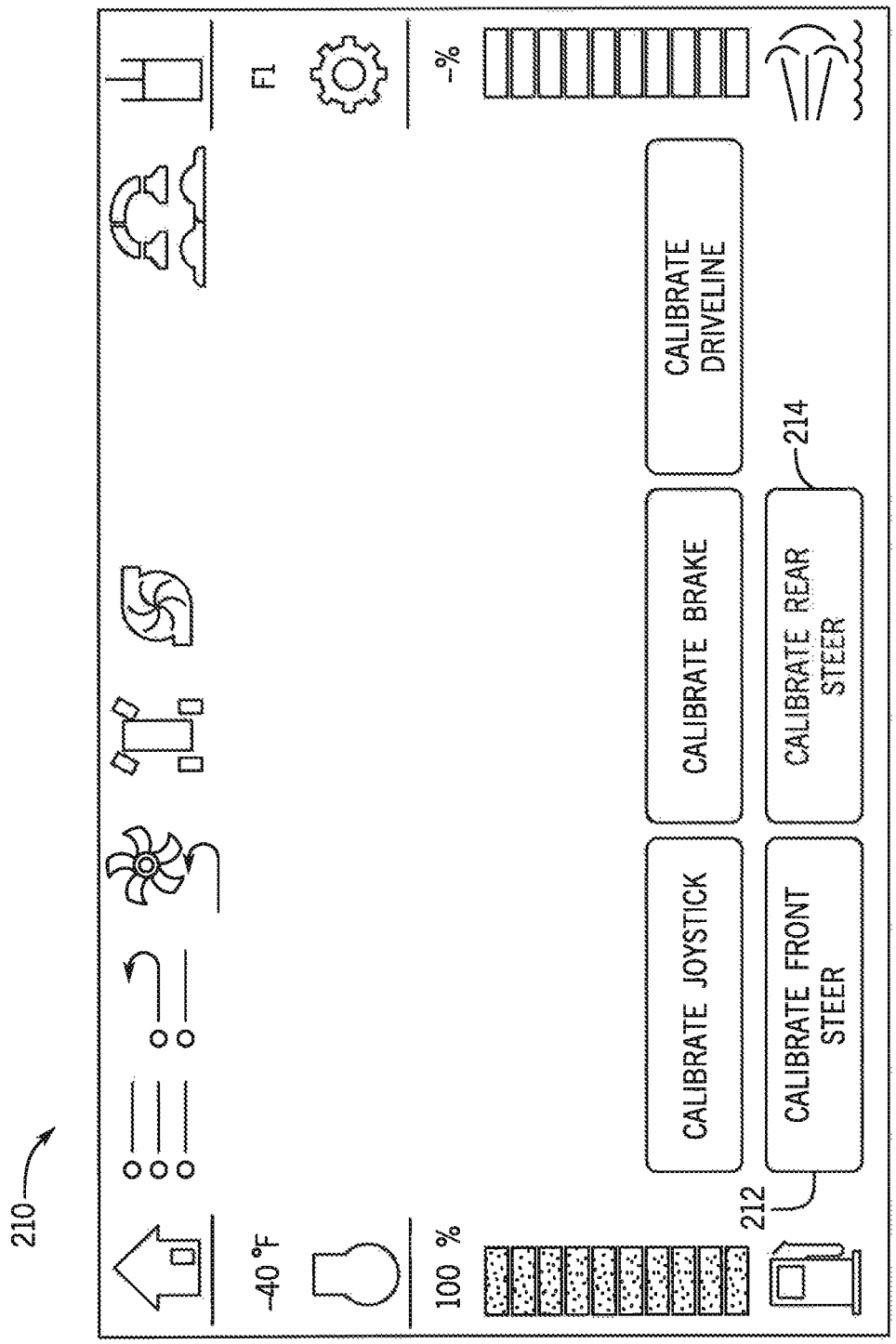
FIG. 5 is an exemplar view provided to a Human Machine Interface (HMI) for automatically calibrating the steering system of the self-propelled off-road agricultural vehicle of FIG. 1.

Referring now to FIG. 5, an exemplar calibration screen 210 may be provided to the HMI 200 for automatically calibrating the steering system of the sprayer 15. A user can make a selection on the HMI 200 to view the calibration screen 210. The calibration screen 210 can include various icons associated with automatic calibration of the steering system 130. The system can receive an input from the user, through the calibration screen 210, to initiate such automatic calibrations. For calibrating the front wheels 128, LF and RF, such as for the two-wheel steering mode, the user can select a "Calibrate Front Steer" icon 212. Similarly, for calibrating the rear wheels 128, LR and RR, such as for the four-wheel steering mode, the user can select a "Calibrate Rear Steer" icon 214, A user touching a respective icon is sufficient to automatically calibrate such aspect so long as other requirements are met, including such as sensed motion and/or sensed operation in a valid temperature range, as described herein. A completion mark, such as a check mark, can optionally be displayed with respect to each icon which has completed calibration, whereas a warning mark, such as an exclamation mark, can be displayed with respect to each icon which has not completed calibration. To ensure sensed operation is in a valid temperature range, the HMI 200 can further display on the calibration screen 210 a current temperature as sensed by the sensor array 202, depending on the particular aspect selected for calibration.

Figure 6:
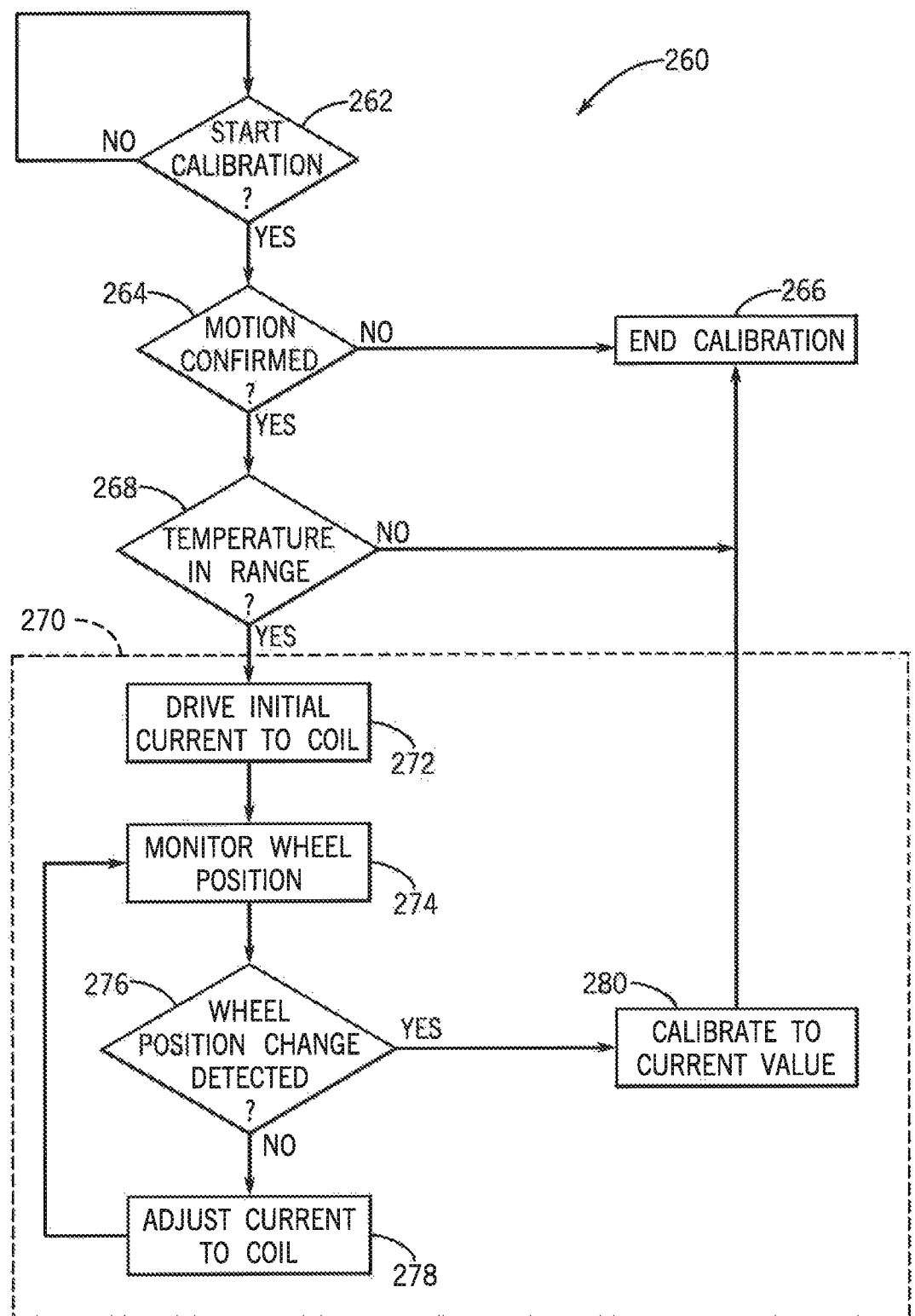
FIG. 6 is flow chart for automatically calibrating the steering system of the self-propelled off-road agricultural vehicle of FIG. 1.

With additional reference to FIG. 6, a process 260 for automatically calibrating steering of the sprayer 15, implemented by a processor executing a program stored in a non-transient medium, is provided in accordance with an aspect of the invention. Beginning at decision step 262, the processor can execute to determine whether a selection for automatically calibrating an aspect of the system has been received. If a selection has not been received ("No"), the process 260 goes no further. However, if a selection has been received to automatically calibrate an aspect the steering system 130 ("Yes"), such as receiving an input from the user to automatically calibrate front steering or rear steering, the process 260 can continue to step 264.

At step 264, the system can confirm that the sprayer 15 is in a ready condition for the particular calibration. A ready condition could comprise, for example, verifying motion or a given traveling speed of the sprayer 15 has reached a predetermined minimum value via a speed sensor 203 configured to sense the traveling speed of the sprayer 15. If the sprayer 15 is not in a ready condition ("No"), the process can end calibration at step 266 and return to the beginning at step 262 to await a calibration command, perhaps of another aspect of the system. However, if the sprayer 15 is in a ready condition ("Yes"), the process can continue to step 268.

At step 26$, the system can determine if the current temperature as sensed by a sensor array 202, depending on front or rear calibration being selected, is in a valid temperature range. This can ensure that the system is warm enough to obtain an accurate calibration. In one aspect, the system can enforce a predetermined minimum temperature value, such as at least 100 degrees Fahrenheit, of particular aspect selected for calibration in order to allow calibration to continue. Also, enforcing the valid temperature range can ensure that the current temperature is below a predetermined maximum value, so that the system is not too hot for potentially stressful calibration activity to prevent damage. If the system is not in the valid temperature range ("No"), the process can end calibration at step 266 and return to the beginning at step 262 to await a calibration command, perhaps of another aspect of the system. However, if the system is in the valid temperature range ("Yes"), the process can continue to calibration block 270.

Figure 7:
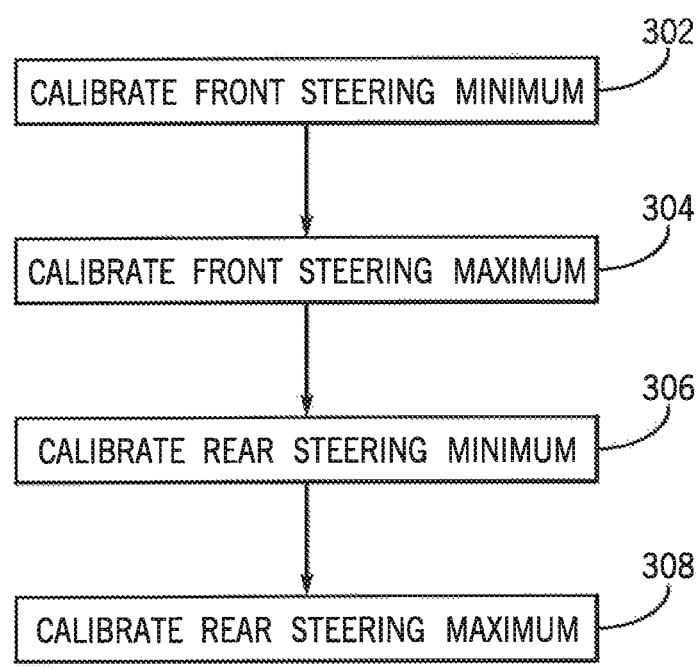
FIG. 7 is flow chart for automatically calibrating various aspects of the steering system according to the present invention.

Calibration block 270 can be carried out with respect to various aspects of the steering system 130, such as front or rear steering calibration, as selected by the user through the calibration screen 210. For example, with additional reference to FIG. 7, the calibration block 270 could comprise one or more of calibrating the front wheels 128, LF and RF, to a minimum value required for turning the front wheels fully in a first direction (such as fully to the left) at block 302; calibrating the front wheels 128, LF and RF, to a maximum value required for turning the front wheels fully in a second direction (such as fully to the right) at block 304; calibrating the rear wheels 128, LR and RR, to a minimum value required for turning the rear wheels fully in the first direction (such as fully to the left) at block 306; and/or calibrating the rear wheels 128, LR and RR, to a maximum value required for turning the rear wheels fully in the second direction (such as fully to the right) at block 308.

Referring again to FIG. 6, the calibration block 270 could comprise, for example, at step 272, driving a voltage or current at an initial magnitude to a particular coil via an electrical signal. Then, at step 274, a particular power actuator 113 of a wheel 128 relevant to the calibration can be monitored, as measured by a position sensor 202b. At decision step 276, if no change in position is detected ("No"), the process can continue to step 278 to adjust the magnitude of the electrical signal. Then, the process can return to step 274, further monitoring the position, and decision step 276. If at decision step 276 a change in position of a power actuator 113 for a given wheel 128 is detected ("Yes"), the process can continue to step 280 to calibrate the electrical signal to the current magnitude. Then, the calibration block 270 can end, returning to step 266 to end calibration, and step 262 to await another calibration command. Otherwise, the process can repeat in a loop, adjusting the magnitude, while monitoring the position, until a calibration value is determined.

The calibration block 270 can execute to calibrate minimum and/or maximum magnitudes of electrical signals for first and/or second direction turns of the front and/or rear wheels 128. For example, the calibration block 270 can execute to calibrate a minimum magnitude of the electrical signal 191 for the front steering pump 90a at block 302, The minimum magnitude may comprise initially setting an electrical current of the electrical signal 191 to 0 milliamps, thereby fully retracting (or extending) the power actuator 113 to turn fully in the first direction, then incrementing, 1 milliamp at a time, until a change in position of the power actuator 113 is sensed, such as the rod portion 114 initially extending from the fully retracted position. Block 270 can similarly be executed for calibrating a minimum value of the electrical signal 192 for the rear steering pump 90b at block 306.

Also, for example, the calibration block 270 can execute to calibrate a maximum magnitude of the electrical signal 191 for the front steering pump 90a at block 302. The maximum magnitude may comprise initially setting an electrical current of the electrical signal 191 to a maximum current, thereby fully extending (or retracting) the power actuator 113 to turn fully in the second direction, then decrementing, 1 milliamp at a time, until a change in position of power actuator 113 is sensed, such as the rod portion 114 initially retracting from the fully extended position. Block 270 can similarly be executed for calibrating a maximum value of the electrical signal 192 for the rear steering pump 90b at block 308.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. An agricultural machine, comprising:
   a chassis supporting a cab and having a plurality of wheels;
   a steering system for steering the wheels and including:
   a plurality of power actuators, each power actuator having a rod portion and a base portion, wherein the rod portion is extendable with respect to the base portion, and wherein extension of the rod portion is operable to turn a given wheel, and
   a hydraulic system configured to variably extend each of the power actuators;
   a processor executing a program stored in a non-transient medium, the processor executing the program to:
   receive an input from a user operable to automatically calibrate the steering system so that a magnitude of an electrical signal for controlling the hydraulic system to produce a minimum or a maximum extension of a power actuator is determined; and
   a temperature sensor configured to sense a temperature of hydraulic fluid running through the hydraulic system and the power actuator, and further comprising the processor executing to calibrate the steering system only when the temperature is above a predetermined minimum value.

2. The agricultural machine of claim 1, wherein the plurality of wheels comprises two front wheels and two rear wheels, and wherein a front wheel is automatically calibrated to implement a two-wheel steering mode.

3. The agricultural machine of claim 1, wherein the plurality of wheels comprises two front wheels and two rear wheels, and wherein a front wheel and a rear wheel are automatically calibrated to implement a four-wheel steering mode.

4. The agricultural machine of claim 1, wherein the plurality of wheels comprises two front wheels and two rear wheels, and wherein the hydraulic system comprises a front steering pump for steering the two front wheels and a rear steering pump for steering the two rear wheels.

5. The agricultural machine of claim 4, wherein the magnitude of the electrical signal is a first magnitude of a first electrical signal for controlling a minimum extension of a power actuator for a front wheel, and further comprising the processor executing to determine a second magnitude of the first electrical signal for controlling a maximum extension of the power actuator for the front wheel, a first magnitude of a second electrical signal for controlling a minimum extension of a power actuator for a rear wheel, and a second magnitude of the second electrical signal for controlling a maximum extension of the power actuator for the rear wheel.

6. The agricultural machine of claim 1, further comprising the processor executing to calibrate the steering system only when the temperature is between the predetermined minimum value and a predetermined maximum value.

7. The agricultural machine of claim 1, further comprising a Human Machine Interface (HMI) provided in the cab, wherein the HMI is operable to receive the input operable to calibrate the steering system.

8. The agricultural machine of claim 1, wherein each power actuator includes a position sensor configured to sense a position of the rod portion with respect to the base portion.

9. The agricultural machine of claim 8, wherein the processor determines the minimum extension of the power actuator by continuously incrementing the magnitude of the electrical signal until a change in position of the power actuator from a fully retracted configuration is detected via the position sensor.

10. The agricultural machine of claim 8, wherein the processor determines the maximum extension of the power actuator by continuously decrementing the magnitude of the electrical signal until a change in position of the power actuator from a fully extended configuration is detected via the position sensor.

11. The agricultural machine of claim 1, further comprising a speed sensor configured to sense a traveling speed, and further comprising the processor executing to calibrate the steering system only when a sensed traveling speed is above a predetermined minimum value.

12. The agricultural machine of claim 1, wherein the electrical signal controls a coil controlling displacement of hydraulic fluid in the hydraulic system.

13. A self-propelled agricultural vehicle, comprising:
a chassis supporting a cab and having two front wheels and two rear wheels for moving the vehicle;
an application system supported by the chassis and including at least one storage container storing a volume of product for delivery onto an agricultural field;
a steering system for steering the wheels and including:
a plurality of power actuators, each power actuator having a rod portion and a base portion, wherein the rod portion is extendable with respect to the base portion, and wherein extension of the rod portion is operable to turn a given wheel, and wherein each power actuator includes a position sensor configured to sense a position of the rod portion with respect to the base portion, and
a hydraulic system configured to variably extend each of the power actuators;
operator controls provided in the cab, the operator controls including a touchscreen Human Machine Interface (HMI); and
a processor executing a program stored in a non-transient medium, the processor executing the program to:
receive an input from a user operable to automatically calibrate the steering system so that a magnitude of a first electrical signal for controlling the hydraulic system to produce a minimum or a maximum extension of a power actuator for a front wheel and a second electrical signal for controlling the hydraulic system to produce a minimum or a maximum extension of a power actuator for a rear wheel are determined, and wherein the processor determines the minimum extension of a power actuator by continuously incrementing a magnitude of an electrical signal until a change in position of the power actuator from a fully retracted configuration is detected via the position sensor.

14. The vehicle of claim 13, wherein the front wheel is automatically calibrated to implement a two-wheel steering mode, and wherein the rear wheel is automatically calibrated to implement a four-wheel steering mode.

15. The vehicle of claim 13, wherein the hydraulic system comprises a front steering pump for steering the two front wheels and a rear steering pump for steering the two rear wheels.

16. The vehicle of claim 13, wherein the magnitude of the first electrical signal is a first magnitude of the first electrical signal for controlling a minimum extension of the power actuator for the front wheel, and wherein the magnitude of the second electrical signal is a first magnitude of the second electrical signal for controlling a minimum extension of the power actuator for the rear wheel, and further comprising the processor executing to determine a second magnitude of the first electrical signal for controlling a maximum extension of the power actuator for the front wheel, and a second magnitude of the second electrical signal for controlling a maximum extension of the power actuator for the rear wheel.

17. The vehicle of claim 13, wherein the processor determines the maximum extension of a power actuator by continuously decrementing a magnitude of an electrical signal until a change in position of the power actuator from a fully extended configuration is detected via the position sensor.

* * * * *